US007138452B2

(12) United States Patent
Kim et al.

(10) Patent No.: US 7,138,452 B2
(45) Date of Patent: Nov. 21, 2006

(54) NANOCOMPOSITE BLEND COMPOSITION HAVING SUPER BARRIER PROPERTY (75) Inventors: Myung-Ho Kim, Daejeon (KR);
Shi-Ho Lee, Daejeon (KR);
Young-Chul Yang, Seoul (KR);
Ku-Min Yang, Seoul (KR)

(73) Assignee: LG Chem, Ltd. (KR)

( * ) Notice: Subject to any disclaimer, the term of this patent is extended or adjusted under 35 U.S.C. 154(b) by 277 days.

(21) Appl. No.: 10/469,270

(22) PCT Filed: Dec. 11, 2002

(86) PCT No.: PCT/KR02/02339

§ 371 (c)(1),
(2), (4) Date: Aug. 27, 2003

(87) PCT Pub. No.: WO03/055792

PCT Pub. Date: Jul. 10, 2003

(65) Prior Publication Data
US 2004/0106719 A1 Jun. 3, 2004

(30) Foreign Application Priority Data
Dec. 27, 2001 (KR) ................. 2001/86319
Dec. 4, 2002 (KR) ................. 2002/76572

(51) Int. Cl.
C08K 3/34 (2006.01)
(52) U.S. Cl. ............ 524/445; 523/205; 523/206; 523/209; 523/216; 524/447; 524/449; 524/451
(58) Field of Classification Search ........ 524/205–206, 524/445, 447–449, 451; 523/209, 216, 205–206
See application file for complete search history.

(56) References Cited

U.S. PATENT DOCUMENTS

| 4,618,528 | A | 10/1986 | Sacks et al. |
| 4,702,954 | A | 10/1987 | Duncan |
| 4,739,007 | A | 4/1988 | Okada et al. |
| 4,810,734 | A | 3/1989 | Kawasumi et al. |
| 4,874,728 | A | 10/1989 | Eilliott et al. |
| 4,889,885 | A | 12/1989 | Usuki et al. |
| 4,971,864 | A | 11/1990 | McCord |
| 5,248,534 | A | 9/1993 | Rosen |
| 5,342,886 | A | 8/1994 | Glotin et al. |
| 5,356,990 | A | 10/1994 | Pucci |
| 5,378,428 | A | 1/1995 | Inoue et al. |
| 5,385,776 | A | 1/1995 | Maxfield et al. |
| 5,476,618 | A | 12/1995 | Ito et al. |
| 5,635,011 | A | 6/1997 | Rosén |
| 5,698,624 | A | 12/1997 | Beall et al. |
| 5,700,560 | A | 12/1997 | Kotani et al. |
| 5,766,751 | A | 6/1998 | Kotani et al. |
| 5,780,376 | A | 7/1998 | Gonzales et al. |
| 5,840,825 | A | 11/1998 | Carlblom et al. |
| 5,846,661 | A | 12/1998 | Basset et al. |
| 5,981,029 | A | 11/1999 | Harada et al. |
| 6,060,549 | A | 5/2000 | Li et al. |
| 6,083,605 | A | 7/2000 | Harada et al. |
| 6,117,932 | A | 9/2000 | Hasegawa et al. |
| 6,225,394 | B1 | 5/2001 | Lan et al. |
| 6,251,980 | B1 | 6/2001 | Lan et al. |
| 6,262,162 | B1 | 7/2001 | Lan et al. |
| 6,284,830 | B1 | 9/2001 | Gottschalk et al. |
| 6,315,093 | B1 | 11/2001 | Miura et al. |
| 6,339,121 | B1 | 1/2002 | Rafailovich et al. |
| 6,358,576 | B1 | 3/2002 | Adur et al. |
| 6,371,318 | B1 | 4/2002 | Riffer |
| 6,376,591 | B1 | 4/2002 | Lan et al. |
| 6,383,723 | B1 | 5/2002 | Lyer et al. |
| 6,387,996 | B1 | 5/2002 | Lan et al. |
| 6,391,449 | B1 | 5/2002 | Lan et al. |
| 6,399,690 | B1 | 6/2002 | Lan et al. |
| 6,403,231 | B1 | 6/2002 | Mueller et al. |
| 6,407,155 | B1 | 6/2002 | Qian et al. |
| 6,414,069 | B1 | 7/2002 | Pinnavaia et al. |
| 6,426,135 | B1 | 7/2002 | Kotani et al. |
| 6,337,046 | B1 | 8/2002 | Barodia et al. |
| 6,436,547 | B1 | 8/2002 | Toft et al. |
| 6,447,845 | B1 | 9/2002 | Nanavati et al. |
| 6,447,860 | B1 | 9/2002 | Mueller et al. |
| 6,462,122 | B1 | 10/2002 | Qian et al. |
| 6,479,160 | B1 | 11/2002 | Tsai et al. |

(Continued)

FOREIGN PATENT DOCUMENTS

CA 2474604 A1 8/2003

(Continued)

OTHER PUBLICATIONS

Myung-Ho Kim et al. "Preparation of High Barrier Containers Based on Nanocomposies". Polymer Processing Technology Team at Technology Center, LG Chem, LTD., 84 Jan-dong, Yusung-gu, Taejeon 305-343, Korea.

(Continued)

Primary Examiner—Peter Szekely
(74) Attorney, Agent, or Firm—Cantor Colburn LLP (57) ABSTRACT The present invention relates to a nanocomposite blend composition having superior barrier properties, and more particularly to a nanocomposite blend composition comprising a polyolefin resin; one or more nanocomposites having barrier properties, selected from an ethylene-vinyl alcohol (EVOH)/intercalated clay nanocomposite, a polyamide/intercalated clay nanocomposite, an ionomer/intercalated clay nanocomposite, and a polyvinyl alcohol (PVA)/intercalated clay nanocomposite; and a compatibilizer. This nanocomposite blend composition has superior mechanical strength and superior barrier properties to oxygen, organic solvent, and moisture. Also, it has superior chemical barrier properties and is applicable to single/multi-layer blow molding and film processing.

29 Claims, 3 Drawing Sheets

U.S. PATENT DOCUMENTS

| | | |
|---|---|---|
| 6,486,253 B1 | 11/2002 | Gilmer et al. |
| 6,548,159 B1 | 4/2003 | Tsai et al. |
| 6,552,113 B1 * | 4/2003 | Bagrodia et al. ........... 524/445 |
| 6,569,533 B1 | 5/2003 | Uchida et al. |
| 6,573,406 B1 | 6/2003 | Muraoka et al. |
| 6,596,803 B1 | 7/2003 | Lan et al. |
| 6,605,655 B1 | 8/2003 | Kato et al. |
| 6,632,868 B1 | 10/2003 | Qian et al. |
| 6,673,406 B1 | 1/2004 | Bekele |
| 6,685,861 B1 | 2/2004 | Akkapeddi et al. |
| 6,709,759 B1 | 3/2004 | Mueller et al. |
| 6,727,001 B1 | 4/2004 | Hochi et al. |
| 6,770,697 B1 * | 8/2004 | Drewniak et al. .......... 524/445 |
| 6,793,994 B1 | 9/2004 | Tsai et al. |
| 6,794,042 B1 | 9/2004 | Merlin et al. |
| 6,828,370 B1 | 12/2004 | Lan et al. |
| 6,841,211 B1 | 1/2005 | Knoll et al. |
| 6,846,532 B1 | 1/2005 | Bensur |
| 6,864,308 B1 | 3/2005 | Rosenthal et al. |
| 6,884,450 B1 | 4/2005 | Wu et al. |
| 6,884,835 B1 | 4/2005 | Ajbani et al. |
| 2002/0028870 A1 | 3/2002 | Lan et al. |
| 2004/0225066 A1 | 11/2004 | Flat et al. |
| 2004/0253463 A1 | 12/2004 | Inui et al. |
| 2005/0256244 A1 | 11/2005 | Liang et al. |

FOREIGN PATENT DOCUMENTS

| | | |
|---|---|---|
| EP | 0015556 B1 | 7/1984 |
| EP | 0210725 B1 | 8/1989 |
| EP | 0358415 A1 | 3/1990 |
| EP | 0506515 | 9/1992 |
| EP | 0990515 | 4/2000 |
| JP | 01-261458 | 10/1989 |
| JP | 01-284552 | 11/1989 |
| JP | 05-043797 | 2/1993 |
| JP | 06-234896 | 8/1994 |
| JP | 08-127089 | 5/1996 |
| JP | 09-143359 | 6/1997 |
| JP | 10-086268 | 4/1998 |
| JP | 10-158414 | 6/1998 |
| JP | 11-129379 | 5/1999 |
| JP | 11-302464 | 11/1999 |
| JP | 11-314307 | 11/1999 |
| JP | 2000-007842 | 1/2000 |
| JP | 2000-094547 | 4/2000 |
| JP | 2000-094548 | 4/2000 |
| JP | 2000-160024 | 6/2000 |
| JP | 2000-290492 | 10/2000 |
| JP | 2000-290505 | 10/2000 |
| JP | 2000-290506 | 10/2000 |
| JP | 2001-009974 | 1/2001 |
| JP | 2001-009982 | 1/2001 |
| JP | 2001-064454 | 3/2001 |
| JP | 2001-165134 | 6/2001 |
| JP | 2001-277437 | 10/2001 |
| JP | 2002-167484 | 6/2002 |
| JP | 2003-073510 | 3/2003 |
| JP | 2003-105141 | 4/2003 |
| JP | 2003-276124 | 9/2003 |
| JP | 2004-131608 | 4/2004 |
| JP | 2004-277740 | 10/2004 |
| JP | 2004-351670 | 12/2004 |
| JP | 2005-138581 | 6/2005 |
| KR | 1019960001031 B1 | 1/1996 |
| KR | 1020010076519 A | 8/2001 |
| KR | 1020010100279 A | 11/2001 |
| KR | 1020020002786 A | 1/2002 |
| KR | 1020020015406 A | 2/2002 |
| KR | 1020020078719 A | 10/2002 |
| KR | 1020020092812 A | 12/2002 |
| KR | 1020030021620 A | 3/2003 |
| KR | 1020030058662 A | 7/2003 |
| KR | 1020030059671 A | 7/2003 |
| KR | 1020030076042 A | 9/2003 |
| KR | 1020040036527 A | 4/2004 |
| KR | 1020040060028 A | 7/2004 |
| KR | 1020040082098 A | 9/2004 |
| KR | 1020040082330 A | 9/2004 |
| KR | 1020040089181 A | 10/2004 |
| KR | 1020050030818 A | 3/2005 |
| WO | WO 98/29245 | 7/1998 |
| WO | WO 99/07790 | 2/1999 |
| WO | WO 00/78540 A1 | 12/2000 |
| WO | WO 01/92390 A2 | 12/2001 |
| WO | WO 01/96237 A2 | 12/2001 |
| WO | WO 02/079318 A2 | 10/2002 |
| WO | WO 2003/093009 A3 | 11/2003 |

OTHER PUBLICATIONS

Richard A. Vaia et al. "Synthesis and Properties of Two-Dimensional Nanostructures by Direct Intercalation of Polymer Melts in Layered Silicates". 1993 American Chemical Society. Chem. Mater. 1993, 5, pp. 1694-1696.

Masaya Kawasumi, et al. "Preparation and Mechanical Properties of Polypropylene-Clay Hybrids". Toyota Central Research and Development Laboratories, Inc., Nagakute-cho, Aichi, 480-11, Japan. 1997 American Chemical Society. Macromolecules 1997, 30, pp. 6333-6338.

Supplementary European Search Report EP 02 79 1076; Completed on Dec. 20, 2005.

Office Action of Japanese Patent Application No.: 2003-556336; Date Mar. 10, 2006; 9 pages (Japanese); Translation of Japanese Patent Application No.: 2003-556336; Date Mar. 10, 2006, 4 pages (English).

* cited by examiner

NANOCOMPOSITE BLEND COMPOSITION HAVING SUPER BARRIER PROPERTY

BACKGROUND OF THE INVENTION (a) Field of the Invention

The present invention relates to a nanocomposite blend composition having superior barrier properties, and more particularly to a nanocomposite blend composition having superior mechanical strength and superior barrier properties to oxygen, organic solvent, and moisture, and which is applicable to single/multi-layer blow molding and film processing.

(b) Description of the Related Art

General-purpose resins, such as polyethylene and polypropylene, are used in many fields due to their superior moldability, mechanical properties, and moisture barrier properties. While these resins have good gas barrier properties as well, they are limited in use for packaging or containers for agrochemicals and foods, which require superior oxygen barrier properties. Therefore, packaging or containers (bottles) for such materials are manufactured in multi-layers by co-extrusion, lamination, coating, etc.

Multi-layer plastic products made of an ethylene-vinyl alcohol (EVOH) copolymer and polyamide are transparent and have good gas barrier properties. However, because ethylene-vinyl alcohol and polyamide are more expensive than general-purpose resins, their contents in the products are restricted, and it is required to make the ethylene-vinyl alcohol and polyamide as thin as possible.

To reduce production costs of plastic containers, a method of compounding ethylene-vinyl alcohol and polyamide with inexpensive polyolefin has been proposed. However, because ethylene-vinyl alcohol and polyamide are not very compatible with polyolefin, the blending is not easy. If ethylene-vinyl alcohol and polyamide are blended insufficiently, mechanical properties of produced films or sheets become poor.

In this regard, a method of using a compatibilizer to increase compatibility of ethylene-vinyl alcohol and polyamide to polyolefin has been proposed. Because the compatibilizer increases compatibility of ethylene-vinyl alcohol and polyamide to polyolefin, selection of a good compatibilizer is an important technical issue in improving mechanical strength and chemical barrier properties of products.

U.S. Pat. No. 4,971,864, U.S. Pat. No. 5,356,990, EP No. 15,556, and EP No. 210,725 disclose a method of using a compatibilizer prepared by grafting polyethylene and maleic anhydride. While this compatibilizer increases oxygen barrier properties and mechanical strength, moisture barrier properties are poor due to the hydrophilic properties of ethylene-vinyl alcohol polyamide and ionomers. Therefore, hydrophobic resin processing at the outermost layer is difficult, and there is no suitable processing condition for obtaining effective barrier property morphology.

As disclosed in U.S. Pat. Nos. 4,739,007, 4,618,528, 4,874,728, 4,889,885, 4,810,734, and 5,385,776, a nanocomposite is an exfoliated or intercalated platelet, tactoidal structure, or dispersion mixture thereof of nanometer dimensions, comprising intercalated clay dispersed in a matrix polymer, such as an oligomer, a polymer, or a blend thereof.

In general, nanocomposite manufacturing technology is divided into two methods.

The first method is the manufacturing method of said polyamide nanocomposite. In this method, monomers are inserted within intercalated organic clay, and the clay platelets are dispersed through inter-layer polymerization. This method is restricted in that it is applicable only when cationic polymerization is possible.

The other method is the melt compounding method which inserts melt polymer chains within intercalated clay and exfoliates it through mechanical compounding. Examples of such method are disclosed in Preparation of polystyrene nanocomposite (R. A. Vaia, et. al, *Chem. Mater.*, 5, 1694 (1993)), Preparation of polypropylene nanocomposite (M. Kawasumi, et. al, *Macromolecules*, 30, 6333(1997)), and Preparation of nylon 6 nanocomposite (U.S. Pat. No. 5,385,776), etc.

Therefore, research on nanocomposite blend compositions having superior mechanical strength and chemical barrier properties and that are capable of realizing effective barrier property morphology is needed.

SUMMARY OF THE INVENTION

The present invention was made in consideration of the problems of the prior art, and it is an object of the present invention to provide a nanocomposite blend composition having superior mechanical strength and superior barrier properties to oxygen, organic solvent, and moisture, and which is applicable to single/multi-layer blow molding and film processing.

It is another object of the present invention to provide a container and a film that comprise said nanocomposite blend composition.

To achieve said objects, the present invention provides a nanocomposite blend composition having barrier properties, comprising:

a) 1 to 97 wt % of a polyolefin resin;
b) 1 to 95 wt % of one or more nanocomposites having barrier properties., selected from:
  i) an ethylene-vinyl alcohol (EVOH)/intercalated clay nanocomposite;
  ii) a polyamide/intercalated clay nanocomposite;
  iii) an ionomer/intercalated clay nanocomposite; and
  iv) a polyvinyl alcohol (PVA)/intercalated clay nanocomposite; and
c) 1 to 95 wt % of a compatibilizer.

The present invention also provides a container and a film that comprise said nanocomposite blend composition.

SYMBOLS OF THE DRAWINGS

10: Continuous polyolefin phase
11: Discontinuous nanocomposite phase

DETAILED DESCRITPION OF THE PREFERRED EMBODIMENTS

The present invention will now be explained in more detail.

The present inventors worked to develop a method of improving mechanical strength and chemical barrier properties of a nanocomposite blend. In doing so, they found that a nanocomposite prepared by exfoliating intercalated clay in a resin having barrier properties, such as ethylene-vinyl alcohol (EVOH), a polyamide, an ionomer, and polyvinyl alcohol (PVA), increases barrier properties to moisture and liquid by extending gas and liquid passage inside the resin, and suppresses parison sagging during blow molding by increasing melt strength of the continuous polyolefin phase. Also; they found that a nanocomposite blend comprising the nanocomposite having barrier properties, polyolefin resin, and compatibilizer has superior mechanical strength and superior barrier properties to oxygen, organic solvents, and moisture.

The nanocomposite blend composition of the present invention is characterized by comprising a polyolefin resin (a); a nanocomposite (b) having barrier properties selected from one or more of i) an ethylene-vinyl alcohol (EVOH)/intercalated clay nanocomposite, ii) a polyamide/intercalated clay nanocomposite, iii) an ionomer/intercalated clay nanocomposite, and iv) a polyvinyl alcohol (PVA)/intercalated clay nanocomposite; and a compatibilizer (c).

For the polyolefin resin (a), a high density polyethylene (HDPE), a low density polyethylene (LDPE), a linear low density polyethylene (LLDPE), an ethylene-propylene polymer, or an ethylene-propylene copolymer can be used.

The content of the polyolefin resin is preferably 1 to 97 wt %, and more preferably 20 to 97 wt %, of 100 wt % of the nanocomposite blend.

The intercalated clay used in the nanocomposite (b) preferably comprises an organic intercalated clay. The organic content of the intercalated clay is preferably 1 to 45 wt %.

The intercalated clay is one or more materials selected from montmorillonite, bentonite, kaolinite, mica, hectorite, fluorohectorite, saponite, beidelite, nontronite, stevensite, vermiculite, hallosite, volkonskoite, suconite, magadite, and kenyalite; and the organic material preferably has a functional group selected from quaternary ammonium, phosphonium, maleate, succinate, acrylate, benzylic hydrogen, and oxazoline.

The content of ethylene in the ethylene-vinyl alcohol (EVOH)/intercalated clay nanocomposite (b, i) is preferably 10 to 50 mol %. If the ethylene content is below 10 mol %, melt molding becomes difficult due to poor processability. Otherwise, if it exceeds 50 mol %, barrier properties to oxygen and liquid becomes insufficient.

For the polyamide of the polyamide/intercalated clay nanocomposite (b, ii), nylon 4.6, nylon 6, nylon 6.6, nylon 6.10, nylon 6.12, nylon 11, nylon 12, or amorphous nylon can be used.

The ionomer of the ionomer/intercalated clay nanocomposite (b, iii) is preferably a copolymer of acrylic acid and ethylene, with a melt index of 0.1 to 10 g/10 min (190° C., 2,160 g).

The content of the nanocomposite having barrier properties (b) is preferably 1 to 95 wt %, and more preferably 1 to 30 wt %, of 100 wt % of the nanocomposite blend.

Figure 1:
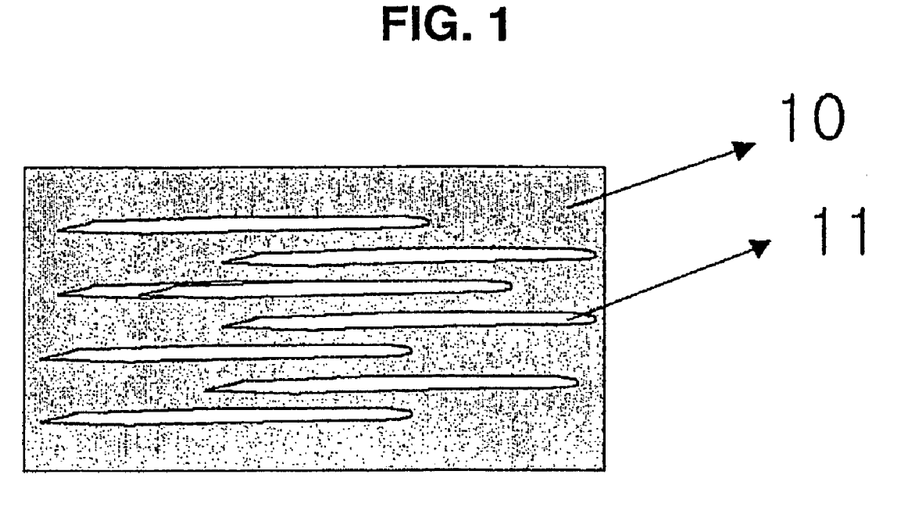
FIG. 1 is a schematic diagram of the morphology of a nanocomposite having barrier properties in the presence of a discontinuous resin.

The nanocomposite having barrier properties offers favorable conditions for the discontinuous resin to realize the morphology of FIG. 1, according to the content of the intercalated clay. The finer the intercalated clay is exfoliated in the discontinuous resin (ethylene-vinyl alcohol, polyamide, ionomer, or polyvinyl alcohol), the better barrier properties can be obtained. This is because the exfoliated intercalated clay forms a barrier film and thereby improves barrier properties and mechanical properties of the resin itself, and ultimately improves barrier properties and mechanical properties of the blend.

Accordingly, the present invention maximizes barrier properties to gas and liquid by compounding the resin having barrier properties and the intercalated clay, dispersing the nanometer-size intercalated clay in the resin, and thereby maximizing the contact area of the polymer chain and the intercalated clay.

The compatibilizer (c) reduces brittleness of the polyolefin resin and improves its compatibility within the nanocomposite to form a composition with a stable structure.

For the compatibilizer, it is preferable to use a hydrocarbon polymer having polar groups. When a hydrocarbon polymer having polar groups is used, the hydrocarbon polymer portion increases affinity of the compatibilizer to the polyolefin resin and to the nanocomposite having barrier properties, and thereby offers a stable structure to the resin composition.

For the compatibilizer, one or more compounds selected from an epoxy-modified polystyrene copolymer, an ethylene-ethylene anhydride-acrylic acid copolymer, an ethylene-ethyl acrylate copolymer, an ethylene-alkyl acrylate-acrylic acid copolymer, a maleic anhydride modified (graft) high-density polyethylene, a maleic anhydride modified (graft) linear low-density polyethylene, an ethylene-alkyl methacrylate-methacrylic acid copolymer, an ethylene-butyl acrylate copolymer, an ethylene-vinyl acetate copolymer, a maleic anhydride modified (graft) ethylene-vinyl acetate copolymer, and modifications thereof, can be used.

The content of the compatibilizer is preferably 1 to 95 wt %, and more preferably 1 to 30 wt %, of 100 wt % of the nanocomposite blend.

When an epoxy-modified polystyrene copolymer is used for the compatibilizer, a copolymer comprising a main chain which comprises 70 to 99 wt % of styrene and 1 to 30 wt % of an epoxy compound represented by Chemical Formula 1, and branches which comprise 1 to 80 wt % of acrylic monomers, is preferable. Its content is 1 to 80 wt % of 100 wt % of the nanocomposite blend.

[Chemical Formula 1]

In Chemical Formula 1, R and R' are $C_{1-20}$ aliphatic residues or $C_{5-20}$ aromatic residues having double bonds at termini.

[Chemical Formula 2]

The maleic anhydride modified (graft) high-density polyethylene, maleic anhydride modified (graft) linear low-density polyethylene, or maleic anhydride modified (graft) ethylene-vinyl acetate copolymer preferably comprises branches having 0.1 to 10 wt % of maleic anhydride for 100 wt % of the main chain.

The nanocomposite blend composition of the present invention can be applied to manufacture of blow-molded products, single-layered products, and multi-layered products. Also, it can be manufactured as containers (bottles) and films by blow molding, extrusion molding, injection molding, or thermoforming.

The manufacturing methods are as follows.

Manufacturing by Single Process

In blow molding and injection molding for producing final products, the nanocomposite having barrier properties (b) is dispersed in the matrix resin (a: polyolefin resin) at the same time using a single screw extruder, a co-rotation twin screw extruder, a counter-rotation twin screw extruder, a continuous compounder, a planetary gear extruder, etc.

Manufacturing by Multi Processes

The nanocomposite having barrier properties (b) is prepared by using a polymer compounder such as a single screw extruder, a co-rotation twin screw extruder, a counter-rotation twin screw extruder, a continuous compounder, a planetary gear compounder, a batch compounder, etc. Then, the nanocomposite is mixed with the matrix resin (a: polyolefin resin) to obtain the final products.

For the manufacturing method, blow molding, extrusion molding, injection molding, and thermoforming can be used. However, the present invention is not limited to said methods, and includes all processing methods for manufacturing containers having barrier properties.

Hereinafter, the present invention is described in more detail through examples. However, the following examples are only for the understanding of the present invention, and the present invention is not limited to the following examples.

EXAMPLE

Example 1

(Preparation of Nanocomposite having Barrier Properties)

15 wt % of an ethylene-vinyl alcohol copolymer (EVOH; E-105B (ethylene content: 44 mol %); Kuraray, Japan; melt index: 5.5 g/10 min; density: 1.14 g/cm$^3$) and 13.3 wt % of maleic anhydride modified (graft) high-density polyethylene (HDPE-g-MAH; Uniroyal Chemical, USA; PB3009 (MAH content: 1%); melt index: 5 g/10 min; density: 0.95 g/cm$^3$), as a compatibilizer, were put in the main hopper of a twin screw extruder (ZSK 25; W&P, USA). Then, 3.3 wt % of montmorillonite (Southern intercalated clay Products, USA; C2OA) organified with intercalated clay was put in separately to the side feeder to prepare an ethylene-vinyl alcohol/intercalated clay nanocomposite. The extrusion temperature condition was 180-190-200-200-200-200-200° C., the screw rate was 300 rpm, and the discharge condition was 10 kg/hr.

(Preparation of Nanocomposite Blend)

The prepared ethylene-vinyl alcohol/intercalated clay nanocomposite was dry-blended with 68.4 wt % of high-density polyethylene (BDO390; LG Chem; melt index: 0.3 g/10 min; density: 0.949 g/cm$^3$) and put in a twin screw extruder. The mixture was extruded to obtain a nanocomposite blend. The extrusion temperature condition was 180-190-190-190-190-190-190° C., the screw rate was 300 rpm, and the discharge condition was 10 kg/hr.

(Manufacture of Container)

The prepared nanocomposite blend was blow-molded to manufacture a 1000 mL container. The processing temperature condition was 160-190-190-190-185° C., and the screw rate was 33 rpm.

Example 2

(Preparation of Nanocomposite having Barrier Properties)

15 wt % of ethylene-vinyl alcohol copolymer and 13.3 wt % of maleic anhydride modified (graft) high-density polyethylene were put in the main hopper of a twin screw extruder. Then, 3.3 wt % of montmorillonite organified with intercalated clay was put in separately to the side feeder to prepare an ethylene-vinyl alcohol/intercalated clay nanocomposite. The extrusion temperature condition was 180-190-200-200-200-200-200° C., the screw rate was 300 rpm, and the discharge condition was 10 kg/hr.

(Preparation of Nanocomposite Blend and Container)

The prepared ethylene-vinyl alcohol/intercalated clay nanocomposite was dry-blended with 68.4 wt % of high-density polyethylene and blow-molded to manufacture a 1000 mL container. The processing temperature condition was 160-190-190-190-185° C., and the screw rate was 33 rpm.

Example 3

(Preparation of Nanocomposite having Barrier Properties)

97 wt % of polyamide (nylon 6) was put in the main hopper of a twin screw extruder. Then, 3 wt % of montmorillonite organified with intercalated clay was put in separately to the side feeder to prepare a polyamide/intercalated clay nanocomposite. The extrusion temperature condition was 220-230-245-245-245-245-245° C., the screw rate was 300 rpm, and the discharge condition was 10 kg/hr.

(Preparation of Nanocomposite Blend and Container)

Figure 2A:
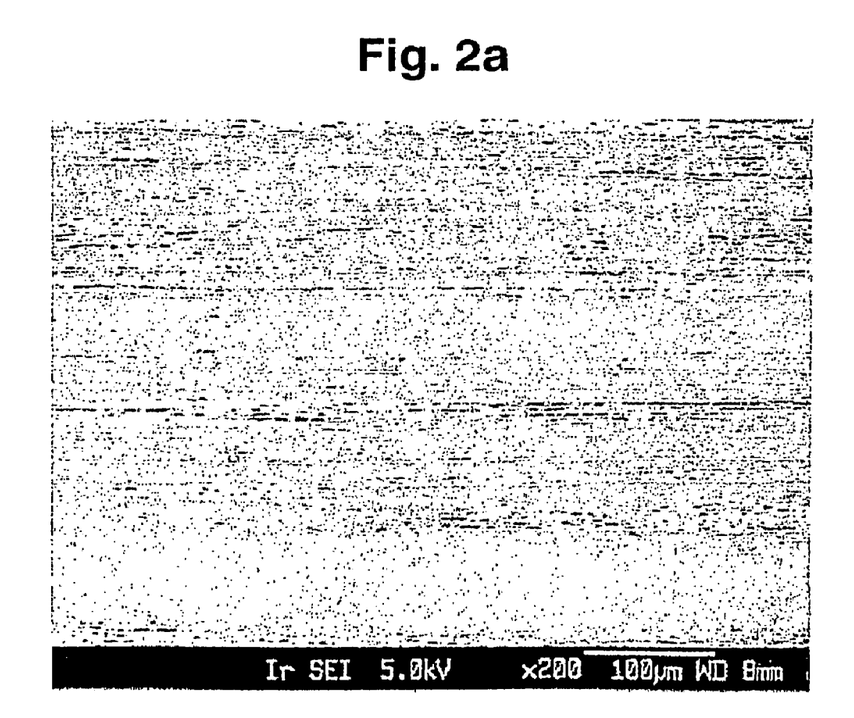
FIG. 2a is an electron microscopic photograph (×200) of a cross-section of a blow-molded container comprising the nanocomposite blend composition prepared by a preferred embodiment of the present invention.
Figure 2B:
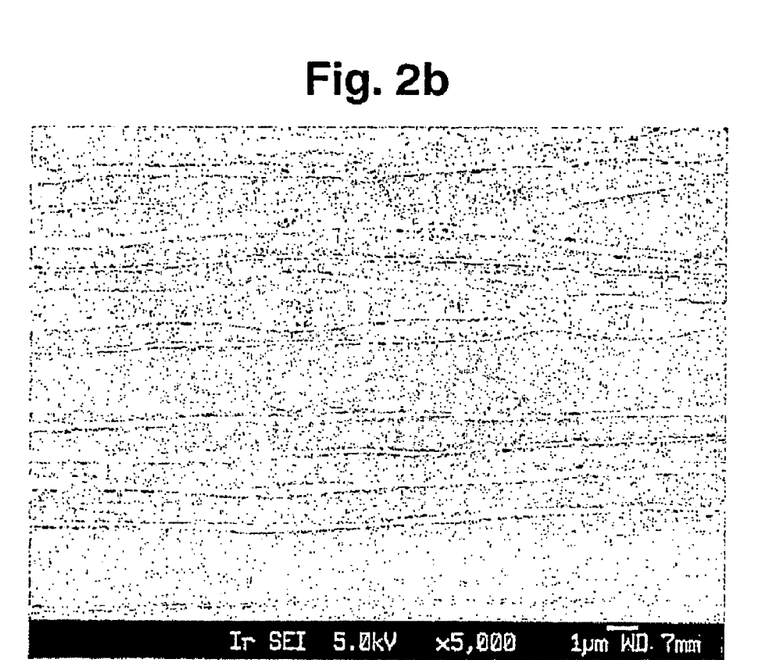
FIG. 2b is an electron microscopic photograph (×5,000) of a cross-section of a blow-molded container comprising the nanocomposite blend composition prepared by a preferred embodiment of the present invention.

15 wt % of the prepared polyamide/intercalated clay nanocomposite was dry-blended with 7 wt % of maleic anhydride modified (graft) high-density polyethylene, a compatibilizer, and 68 wt % of high-density polyethylene, and blow-molded to manufacture a 1000 mL container. The processing temperature condition was 160-190-190-190-185° C., and the screw rate was 33 rpm. A disc-patterned structure was identified when the cross-section of the blow-molded container was observed with an electron microscope (×200; ×5,000). The results are shown in FIG. 2a and FIG. 2b.

Example 4

(Preparation of Nanocomposite having Barrier Properties)

97 wt % of polyamide (nylon 6) was put in the main hopper of a twin screw extruder. Then, 3 wt % of montmorillonite organified with intercalated clay was put in separately to the side feeder to prepare a polyamide/intercalated clay nanocomposite. The extrusion temperature condition was 220-230-245-245-245-245-245° C., the screw rate was 300 rpm, and the discharge condition was 10 kg/hr.

(Preparation of Nanocomposite Blend and Container)

The prepared polyamide/intercalated clay nanocomposite was dry-blended with 7 wt % of epoxy-modified polystyrene copolymer (311×121×41; Johnson Polymer, USA), a compatibilizer, and 68 wt % of high-density polyethylene, and blow-molded to manufacture a 1000 mL container. The processing temperature condition was 160-190-190-190-185° C., and the screw rate was 33 rpm.

Comparative Example 1

100 wt % of high-density polyethylene was blow-molded to manufacture a 1000 mL container.

Comparative Example 2

The same procedure of Example 1 was carried out, except that montmorillonite organified with intercalated clay was not used.

Comparative Example 3

The same procedure of Example 2 was carried out, except that montmorillonite organified with intercalated clay was not used.

Comparative Example 4

The same procedure of Example 3 was carried out, except that montmorillonite organified with intercalated clay was not used.

Comparative Example 5

Figure 3A:
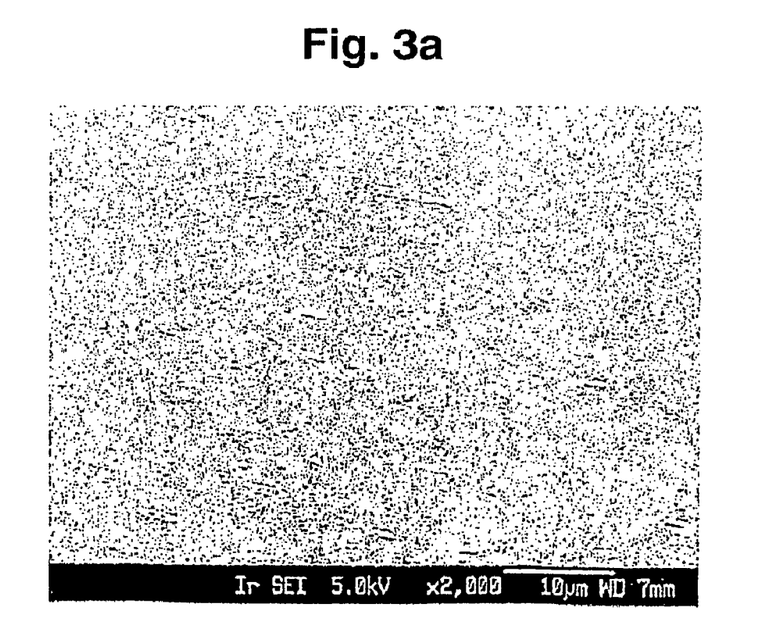
FIG. 3a is an electron microscopic photograph (×2,000) of a cross-section of a blow-molded container comprising a blend composition not comprising the nanocomposite having barrier properties of the present invention.
Figure 3B:
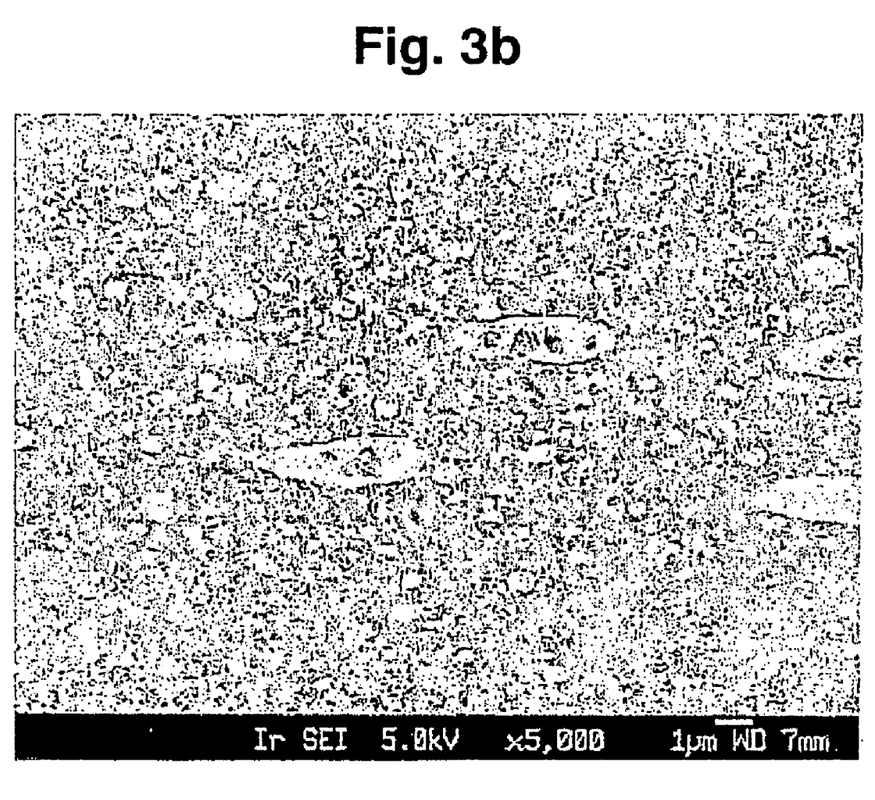
FIG. 3b is an electron microscopic photograph (×5,000) of a cross-section of a blow-molded container comprising a blend composition not comprising the nanocomposite having barrier properties of the present invention.

The same procedure of Example 4 was carried out, except that montmorillonite organified with intercalated clay was not used. The cross-section of the blow-molded container was observed with an electron microscope (×2,000; ×5,000). The results are shown in FIG. 3a and FIG. 3b.

Comparative Example 6

(Preparation of Nanocomposite having Barrier Properties)

97 wt % of high-density polyethylene was put in the main hopper of a twin screw extruder. Then, 3 wt % of montmorillonite organified with intercalated clay was put in separately to the side feeder to prepare a high-density polyethylene/intercalated clay nanocomposite. The extrusion temperature condition was 175-190-190-190-190-190-190° C., the screw rate was 300 rpm, and the discharge condition was 10 kg/hr.

(Preparation of Nanocomposite Blend and Container)

The prepared high-density polyethylene/intercalated clay nanocomposite was blow-molded to manufacture a 1000 mL container. The processing temperature condition was 160-190-190-190-185° C., and the screw rate was 33 rpm.

Experimental Example

For the blow-molded containers manufactured in Examples 1 and 2 and Comparative Examples 1 to 3, barrier properties to liquid and gas were determined by the following method. The results are shown in Table 1.

a) Liquid barrier properties—Toluene, Desys herbicide (1% of deltametrine+emulsifier, stabilizer, and solvent; Kyung Nong), Batsa insecticide (50% of BPMC+50% of emulsifier and solvent), and water were put in the containers manufactured in Examples 1 and 2 and Comparative Examples 1 to 3. Then, the weight change was determined after 30 days under a condition of forced exhaust at 50° C.

b) Gas barrier properties ($cC/m^2 \cdot day \cdot atm$)—The containers blow-molded in Examples 1 and 2 and Comparative Examples 1 to 3 were left alone under the condition of a temperature of 23° C. and a relative humidity of 50% for 1 day. Then, the gas penetration rate was determined (Mocon OX-TRAN 2/20, U.S.A).

TABLE 1

| | Liquid barrier properties (%) | | | | | Gas barrier properties ($cc/m^2 \cdot day \cdot atm$) | |
| --- | --- | --- | --- | --- | --- | --- | --- |
| | Weight change at 25° C. | Weight change at 50° C. | | | | Oxygen | $CO_2$ |
| Classification | Toluene | Toluene | Desys | Batsa | Water | penetration | penetration |
| Example 1 | 1.29 | 14.70 | 15.24 | 2.40 | 0.000014 | 4,105 | 10,020 |
| Example 2 | 0.03 | 0.97 | 0.50 | 0.03 | 0.000002 | 82 | 167 |
| Example 3 | 0.02 | 0.85 | 0.43 | 0.03 | 0.000010 | 454 | 426 |
| Example 4 | 0.02 | 0.88 | 0.52 | 0.04 | 0.000014 | 522 | 504 |
| Comparative Example 1 | 3.45 | 32.52 | 26.61 | 5.60 | 0.000039 | 12,312 | 23,097 |
| Comparative Example 2 | 1.14 | 12.88 | 13.92 | 1.64 | 0.000466 | 1,320 | 1,824 |
| Comparative Example 3 | 1.70 | 15.52 | 16.91 | 2.49 | 0.000614 | 1,892 | 2,772 |
| Comparative Example 4 | 1.37 | 13.25 | 9.36 | 2.11 | 0.000062 | 2,929 | 4,116 |
| Comparative Example 5 | 1.44 | 15.17 | 10.03 | 2.43 | 0.000089 | 3,323 | 5,287 |
| Comparative Example 6 | 2.96 | 27.45 | 21.66 | 1.43 | 0.000031 | 11,204 | 20,194 |

As shown in Table 1, nanocomposite blend compositions of Examples 1 to 4 according to the present invention, which comprise a polyolefin resin; one or more nanocomposites having barrier properties, selected from an ethylene-vinyl alcohol (EVOH)/intercalated clay nanocomposite, a polyamide/intercalated clay nanocomposite, an ionomer/intercalated clay nanocomposite, and a polyvinyl alcohol (PVA)/intercalated clay nanocomposite; and a compatibilizer, have better barrier properties to liquid and gas than those of Comparative Examples 1 to 6.

As described above, the nanocomposite blend composition of the present invention has superior mechanical strength and superior barrier properties to oxygen, organic solvent, and moisture. Also, it has good chemical barrier properties, and is applicable to single/multi-layer blow molding and film processing.

What is claimed is:

1. A nanocomposite blend composition having barrier properties, comprising:
   a) 1 to 97 wt % of a polyolefin resin;
   b) 1 to 95 wt % of one or more nanocomposites having barrier properties, selected from the group consisting of:
      i) an ethylene-vinyl alcohol (EVOH)/intercalated clay nanocomposite;
      ii) a polyamide/intercalated clay nanocomposite;
      iii) an ionomer/intercalated clay nanocomposite; and
      iv) a polyvinyl alcohol (PVA)/intercalated clay nanocomposite; and
   c) 1 to 95 wt % of a compatibilizer.

2. The nanocomposite blend composition according to claim 1, wherein the polyolefin resin (a) is one or more materials selected from the group consisting of a high density polyethylene (HDPE), a low-density polyethylene (LDPE), a linear low-density polyethylene (LLDPE), an ethylene-propylene polymer, and an ethylene-propylene copolymer.

3. The nanocomposite blend composition according to claim 1, wherein the intercalated clay of the nanocomposite (b) is one or more materials selected from the group consisting of montmorillonite, bentonite, kaolinite, mica, hectorite, fluorohectorite, saponite, beidelite, nontronite, stevensite, vermiculite, hallosite, volkonskoite, suconite, magadite, and kenyalite.

4. The nanocomposite blend composition according to claim 1, wherein the intercalated clay of the nanocomposite (b) comprises 1 to 45 wt % to of organic material.

5. The nanocomposite blend composition according to claim 4, wherein the organic material has one or more functional groups selected from the group consisting of quaternary ammonium, phosphonium, maleate, succinate, acrylate, benzylic hydrogen, and oxazoline.

6. The nanocomposite blend composition according to claim 1, wherein the ethylene content of the ethylene-vinyl alcohol of the ethylene vinyl alcohol (EVOH)/intercalated clay nanocomposite (b, i) is 10 to 50 mol %.

7. The nanocomposite blend composition according to claim 1, wherein the polyamide of the polyamide/intercalated clay nanocomposite (b, ii) is one or more materials selected from the group consisting of nylon 4.6, nylon 6, nylon 6.6, nylon 6.10, nylon 6.12, nylon 11, nylon 12, and amorphous nylon.

8. The nanocomposite blend composition according to claim 1, wherein the melt index of the ionomer of the ionomer/intercalated clay nanocomposite (b, iii) is 0.1 to 10 g/10 min (190° C., 2,160 g).

9. The nanocomposite blend composition according to claim 1, wherein the compatibilizer (c) is one or more compounds selected from the group consisting of an ethylene-ethylene anhydride-acrylic acid copolymer, an ethylene-ethyl acrylate copolymer, an ethylene-alkyl acrylate-acrylic acid copolymer, a maleic anhydride modified (graft) high-density polyethylene, a maleic anhydride modified (graft) linear low-density polyethylene, an ethylene-alkyl methacrylate-methacrylic acid copolymer, an ethylene-butyl acrylate copolymer, an ethylene-vinyl acetate copolymer, a maleic anhydride modified (graft) ethylene-vinyl acetate copolymer, and modifications thereof.

10. The nanocomposite blend composition according to claim 1, wherein the compatibilizer (c) comprises 1 to 80 wt % of a copolymer comprising a main chain of styrene and epoxy compounds and branches of acrylic monomers for 100 wt % of the nanocomposite blend.

11. The nanocomposite blend composition according to claim 10, wherein the epoxy-modified polystyrene copolymer comprises:
   a) a main chain comprising:
      i) 70 to 99 wt % of styrene; and
      ii) 1, to 30 wt % of an epoxy compound represented by the following Chemical Formula 1; and
   b) branches comprising 1 to 80 wt % of acrylic monomers represented by the following Chemical Formula 2:

[Chemical Formula 1]

(R and R' are $C_{1-20}$ aliphatic residues or $C_{5-20}$ aromatic residues having double bonds at termini.).

[Chemical Formula 2]

12. The nanocomposite blend composition according to claim 9, wherein the maleic anhydride modified (graft) high-density polyethylene, maleic anhydride modified (graft) linear low-density polyethylene, and maleic anhydride modified (graft) ethylene-vinyl acetate copolymer have branches comprising 0.1 to 10 wt % of maleic anhydride for 100 wt % of the main chain.

13. A container comprising the nanocomposite blend composition of claim 1.

14. A film comprising the nanocomposite blend composition of claim 1.

15. A nanocomposite blend composition having barrier properties, comprising:
   a) 1 to 97 wt % of a polyolefin resin;
   b) 1 to 95 wt % of an ethylene-vinyl alcohol (EVOH)/intercalated clay nanocomposite; and
   c) 1 to 95 wt % of a compatibilizer.

16. The nanocomposite blend composition according to claim 15, wherein the polyolefin resin (a) is one or more materials selected from the group consisting of a high density polyethylene (HDPE), a low-density polyethylene (LDPE), a linear low-density polyethylene (LLDPE), an ethylene-propylene polymer, and an ethylene-propylene copolymer.

17. The nanocomposite blend composition according to claim 15, wherein the intercalated clay of the nanocomposite is one or more materials selected from the group consisting of montmorillonite, bentonite, kaolinite, mica, hectorite, fluorohectorite, saponite, beidelite, nontronite, stevensite, vermiculite, hallosite, volkonskoite, suconite, magadite, and kenyalite.

18. The nanocomposite blend composition according to claim 15, wherein the compatibilizer (c) is one or more compounds selected from the group consisting of an ethylene-ethylene anhydride-acrylic acid copolymer, an ethylene-ethyl acrylate copolymer, an ethylene-alkyl acrylate-acrylic acid copolymer, a maleic anhydride modified (graft) high-density polyethylene, a maleic anhydride modified (graft) linear low-density polyethylene, an ethylene-alkyl methacrylate-methacrylic acid copolymer, an ethylene-butyl acrylate copolymer, an ethylene-vinyl acetate copolymer, a maleic anhydride modified (graft) ethylene-vinyl acetate copolymer, and modifications thereof.

19. A nanocomposite blend composition having barrier properties, comprising:
   a) 1 to 97 wt % of a polyolefin resin;
   b) 1 to 95 wt % of a polyamide/intercalated clay nanocomposite; and
   c) 1 to 95 wt % of a compatibilizer.

20. The nanocomposite blend composition according to claim 19, wherein the polyamide of the polyamide/intercalated clay nanocomposite is one or more materials selected from the group consisting of nylon 4.6, nylon 6, nylon 6.6, nylon 6.10, nylon 6.12, nylon 11, nylon 12, and amorphous nylon.

21. The nanocomposite blend composition according to claim 19, wherein the intercalated clay of the nanocomposite is one or more materials selected from the group consisting of montmorillonite, bentonite, kaolinite, mica, hectorite, fluorohectorite, saponite, beidelite, nontronite, stevensite, vermiculite, hallosite, volkonskoite, suconite, magadite, and kenyalite.

22. The nanocomposite blend composition according to claim 19, wherein the compatibilizer (c) is one or more compounds selected from the group consisting of an ethylene-ethylene anhydride-acrylic acid copolymer, an ethylene-ethyl acrylate copolymer, an ethylene-alkyl acrylate-acrylic acid copolymer, a maleic anhydride modified (graft) high-density polyethylene, a maleic anhydride modified (graft) linear low-density polyethylene, an ethylene-alkyl methacrylate-methacrylic acid copolymer, an ethylene-butyl acrylate copolymer, an ethylene-vinyl acetate copolymer, a maleic anhydride modified (graft) ethylene-vinyl acetate copolymer, and modifications thereof.

23. A nanocomposite blend composition having barrier properties, comprising:
   a) 1 to 97 wt % of a polyolefin resin;
   b) 1 to 95 wt % of an ionomer/intercalated clay nanocomposite; and
   c) 1 to 95 wt % of a compatibilizer.

24. The nanocomposite blend composition according to claim 23, wherein the melt index of the ionomer of the ionomer/intercalated clay nanocomposite is 0.1 to 10 g/10 min (190° C., 2,160 g).

25. The nanocomposite blend composition according to claim 23, wherein the intercalated clay of the nanocomposite is one or more materials selected from the group consisting of montmorillonite, bentonite, kaolinite, mica, hectorite, fluorohectorite, saponite, beidelite, nontronite, stevensite, vermiculite, hallosite, volkonskoite, suconite, magadite, and kenyalite.

26. The nanocomposite blend composition according to claim 23, wherein the compatibilizer (c) is one or more compounds selected from the group consisting of an ethylene-ethylene anhydride-acrylic acid copolymer, an ethylene-ethyl acrylate copolymer, an ethylene-alkyl acrylate-acrylic acid copolymer, a maleic anhydride modified (graft) high-density polyethylene, a maleic anhydride modified (graft) linear low-density polyethylene, an ethylene-alkyl methacrylate-methacrylic acid copolymer, an ethylene-butyl acrylate copolymer, an ethylene-vinyl acetate copolymer, a maleic anhydride modified (graft) ethylene-vinyl acetate copolymer, and modifications thereof.

27. A nanocomposite blend composition having barrier properties, comprising:
   a) 1 to 97 wt % of a polyolefin resin;
   b) 1 to 95 wt % of a polyvinyl alcohol (PVA)/intercalated clay nanocomposite; and
   c) 1 to 95 wt % of a compatibilizer.

28. The nanocomposite blend composition according to claim 27, wherein the intercalated clay of the nanocomposite is one or more materials selected from the group consisting of montmorillonite, bentonite, kaolinite, mica, hectorite, fluorohectorite, saponite, beidelite, nontronite, stevensite, vermiculite, hallosite, volkonskoite, suconite, magadite, and kenyalite.

29. The nanocomposite blend composition according to claim 27, wherein the compatibilizer (c) is one or more compounds selected from the group consisting of an ethylene-ethylene anhydride-acrylic acid copolymer, an ethylene-ethyl acrylate copolymer, an ethylene-alkyl acrylate-acrylic acid copolymer, a maleic anhydride modified (graft) high-density polyethylene, a maleic anhydride modified (graft) linear low-density polyethylene, an ethylene-alkyl methacrylate-methacrylic acid copolymer, an ethylene-butyl acrylate copolymer, an ethylene-vinyl acetate copolymer, a maleic anhydride modified (graft) ethylene-vinyl acetate copolymer, and modifications thereof.

* * * * *